US006788483B1

United States Patent
Ferris et al.

(10) Patent No.: US 6,788,483 B1
(45) Date of Patent: Sep. 7, 2004

(54) DISK DRIVE COMPRISING A PROGRAMMABLE INVERTING VOLTAGE REGULATOR CONFIGURED RELATIVE TO THE DISK DRIVE'S MODE OF OPERATION

(75) Inventors: Timothy A. Ferris, Mission Viejo, CA (US); Robert P. Ryan, Mission Viejo, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 308 days.

(21) Appl. No.: 09/945,076

(22) Filed: Aug. 31, 2001

(51) Int. Cl.[7] ................................................. G11B 5/09
(52) U.S. Cl. ................................................. 360/46; 360/67
(58) Field of Search .............................. 360/46, 65, 67

(56) References Cited

U.S. PATENT DOCUMENTS

| 5,825,165 A | 10/1998 | Kitching et al. |
| 5,949,222 A | 9/1999 | Buono |
| 5,994,885 A | 11/1999 | Wilcox et al. |
| 6,157,182 A | 12/2000 | Tanaka et al. |
| 6,178,055 B1 * | 1/2001 | Janz ............................ 360/46 |

OTHER PUBLICATIONS

STMicroElectronics Specification for ST755, "Adjustable Inverting Negative Output Current Mode PWM Regulator", Sep., 2000, http://www.st.com.

* cited by examiner

*Primary Examiner*—David Hudspeth
*Assistant Examiner*—Varsha A. Kapadia
(74) *Attorney, Agent, or Firm*—Milad G. Shara, Esq.; Howard H. Sheerin, Esq.

(57) ABSTRACT

A disk drive comprising a programmable inverting voltage regulator (PIVR) for generating an inverted voltage supply applied to a preamp is disclosed. The PIVR is programmably configured relative to the disk drive's mode of operation, including a read mode and a write mode.

25 Claims, 6 Drawing Sheets

DISK DRIVE COMPRISING A PROGRAMMABLE INVERTING VOLTAGE REGULATOR CONFIGURED RELATIVE TO THE DISK DRIVE'S MODE OF OPERATION

BACKGROUND OF THE INVENTION

1. Field of the Invention

The present invention relates to disk drives. More particularly, the present invention relates to a disk drive comprising a programmable inverting voltage regulator configured relative to the disk drive's mode of operation.

2. Description of the Prior Art

The preamp in a disk drive requires positive and negative supplies. The negative supply is generated by inverting the positive supply within the disk drive using an inverting voltage regulator. The inverting voltage regulator is typically implemented as a switching regulator. A switch is switched on in order to apply the positive supply to an inductor to charge the inductor with current, and then switched off to discharge the energy stored in the inductor into a capacitor to generate the negative supply. It is desirable to minimize the power consumption of the inverting voltage regulator, particularly in mobile applications, as well as minimize the noise induced in the read signal by the switching regulator. Further, it is desirable to minimize the size of the inductor and capacitor in order to reduce the cost of the disk drive.

There is, therefore, the need for a more efficient inverting voltage regulator which reduces noise in the read signal. Further, there is a need for an inverting voltage regulator employing a smaller, less expensive inductor and capacitor for use in generating the negative supply for a preamp in a disk drive.

SUMMARY OF THE INVENTION

The present invention may be regarded as a disk drive comprising a disk, a head actuated radially over the disk, and a preamp for supplying a write current to the head during a write mode and for amplifying a read signal generated by the head during a read mode. The disk drive receives a non-inverted voltage supply having a first polarity and comprises a programmable inverting voltage regulator (PIVR), responsive to the non-inverted voltage supply, for generating an inverted voltage supply having a polarity opposite the first polarity, the non-inverted and inverted voltage supplies applied to the preamp. The disk drive further comprises a controller for generating a control signal to configure the programmable inverting voltage regulator relative to at least the read and write modes.

In one embodiment, the PIVR comprises an inductor, a capacitor, and a switch comprising a first state and a second state, the first state for applying the non-inverted voltage supply to the inductor to generate a current in the inductor and the second state for disconnecting the non-inverted voltage supply from the inductor to discharge the current into the capacitor to generate the inverted voltage supply. The PIVR further comprises a diode for isolating the non-inverted voltage supply from the inverted voltage supply, and a current sensor for sensing the current in the inductor and for generating a current sense signal. A hysteretic comparator within the PIVR controls the state of the switch by comparing the current sense signal to a first threshold and to a second threshold. The hysteretic comparator configures the switch into the first state when the current sense signal exceeds the first threshold and into the second state when the current sense signal exceeds the second threshold, wherein the first threshold is substantially different than the second threshold. At least one of the first and second thresholds is programmably configured by the controller relative to the disk drive's mode of operation. A voltage comparator within the PIVR disables the hysteretic comparator when the second voltage supply exceeds a third threshold.

In one embodiment the first and second thresholds are generated using current sources. In an alternative embodiment the first and second thresholds are generated using voltage sources.

In one embodiment the hysteretic comparator comprises a programmable resistor for programming the at least one of the first and second thresholds.

In yet another embodiment, the switch, current sensor, and hysteretic comparator are implemented in an integrated circuit, and the inductor and capacitor are implemented external to the integrated circuit.

The present invention may also be regarded as a power driver integrated circuit (IC) for use in a disk drive. The disk drive comprises a disk, a spindle motor for rotating the disk, a head, a voice coil motor (VCM) for actuating the head radially over the disk, and a preamp for supplying a write current to the head during a write mode and for amplifying a read signal generated by the head during a read mode. The power driver IC comprises an input for receiving a non-inverted voltage supply having a first polarity, circuitry for generating control signals applied to the spindle motor and VCM, and a programmable inverting voltage regulator (PIVR) responsive to the non-inverted voltage supply. The PIVR for generating an inverted voltage supply having a polarity opposite the first polarity, wherein the non-inverted and inverted voltage supplies for use by the preamp. The PIVR is configurable relative to at least the write mode and the read mode.

The present invention may also be regarded as a programmable inverting voltage regulator (PIVR) for use in supplying an inverted voltage supply to a preamp in a disk drive. The PIVR comprises an input for receiving a non-inverted voltage supply, an inductor, a capacitor, and a switch comprising a first state and a second state, the first state for applying the non-inverted voltage supply to the inductor to generate a current in the inductor and the second state for disconnecting the non-inverted voltage supply from the inductor to discharge the current into the capacitor to generate the inverted voltage supply. The PIVR further comprises a diode for isolating the non-inverted voltage supply from the inverted voltage supply, and a current sensor for sensing the current in the inductor and for generating a current sense signal. A hysteretic comparator within the PIVR controls the state of the switch by comparing the current sense signal to a first threshold and to a second threshold. The hysteretic comparator configures the switch into the first state when the current sense signal exceeds the first threshold and into the second state when the current sense signal exceeds the second threshold, wherein the first threshold is substantially different than the second threshold. A voltage comparator within the PIVR disables the hysteretic comparator when the second voltage supply exceeds a third threshold.

DESCRIPTION OF THE PREFERRED EMBODIMENTS

Figure 1:
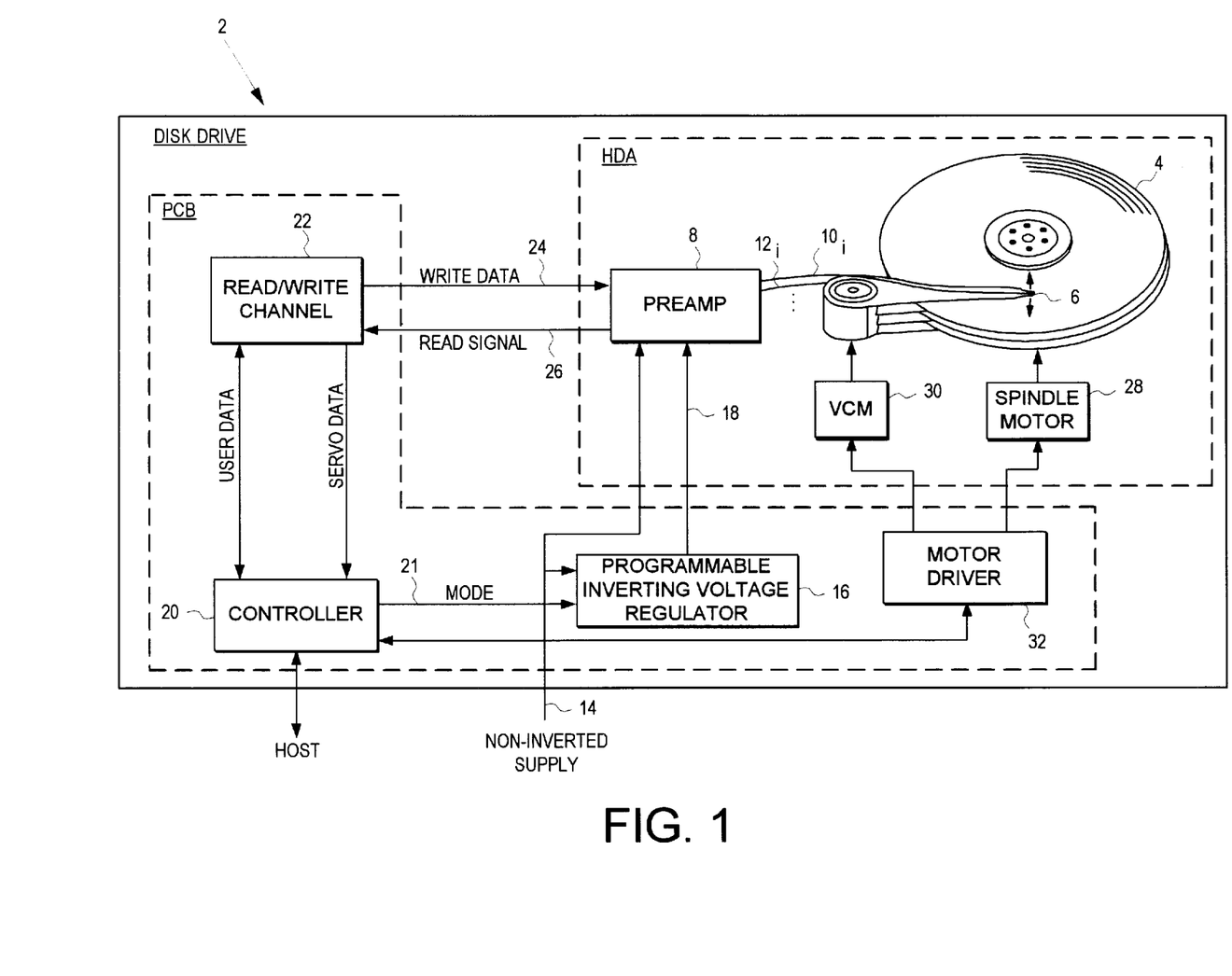
FIG. 1 shows a disk drive according to an embodiment of the present invention comprising a programmable inverting voltage regulator (PIVR) for generating an inverted voltage supply applied to a preamp, wherein the PIVR is programmed relative to the disk drive's mode of operation.

FIG. 1 shows a disk drive 2 according to an embodiment of the present invention as comprising a disk 4, a head 6 actuated radially over the disk 4, and a preamp 8 for supplying a write current $10i$ to the head 6 during a write mode and for amplifying a read signal $12i$ generated by the head 6 during a read mode. The disk drive 2 receives a non-inverted voltage supply 14 having a first polarity and comprises a programmable inverting voltage regulator (PIVR) 16 responsive to the non-inverted voltage supply 14 for generating an inverted voltage supply 18 having a polarity opposite the first polarity, the non-inverted and inverted voltage supplies 14 and 18 applied to the preamp 8. The disk drive 2 further comprises a controller 20 for generating a control signal 21 to configure the PIVR 16 relative to at least two modes of operation including the write mode and the read mode.

The disk drive 2 of FIG. 1 further comprises a read/write channel 22 which receives user data from the controller 20 during write operations. The read/write channel 22 performs suitable encoding (e.g., RLL encoding) to generate write data 24 applied to the preamp 8. During read operations, the preamp 8 generates a read signal 26 supplied to the read/write channel 22 which detects and demodulates the recorded data. The read/write channel 22 also detects and demodulates servo data for use in servo positioning the head 6. The disk drive of FIG. 2 further comprises a spindle motor 28 for rotating the disk 4 and a voice coil motor (VCM) 30 for actuating the head 6 radially over the disk 4. A motor driver 32 generates the appropriate control signals applied to the spindle motor 28 and VCM 30 in response to control signals received from the controller 20.

Figure 2:
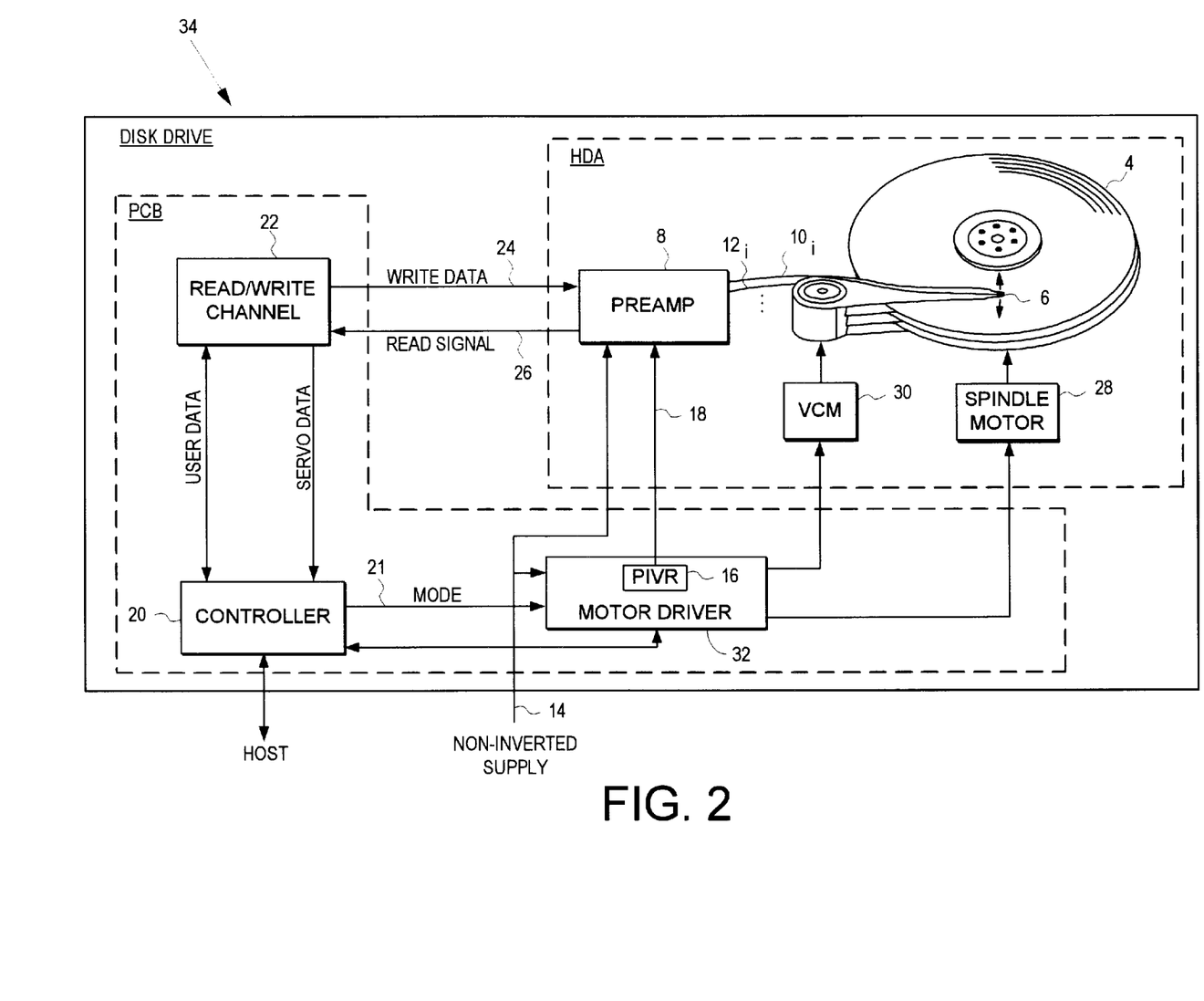
FIG. 2 shows a disk drive according to an embodiment of the present invention comprising a motor driver integrated circuit (IC) with an integrated PIVR.

In the embodiment of FIG. 1, the PIVR 16 and motor driver 32 are implemented as separate integrated circuits (ICs). FIG. 2 shows a disk drive 34 according to an alternative embodiment of the present invention wherein the PIVR 16 is implemented as part of the motor driver 32 within a single IC.

Figure 3:
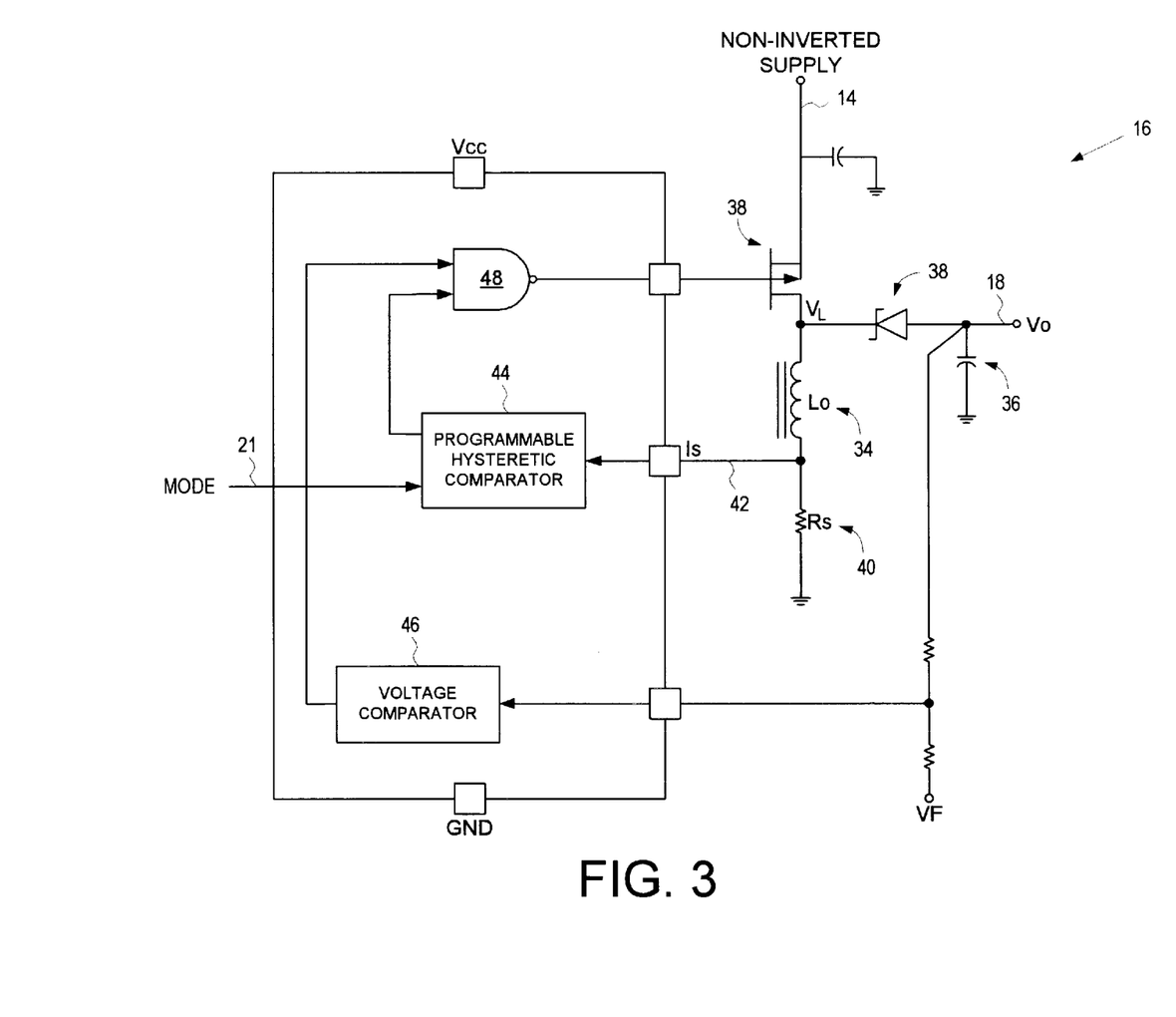
FIG. 3 shows a PIVR according to an embodiment of the present invention comprising a programmable hysteretic comparator and a voltage comparator.

FIG. 3 shows a suitable PIVR 16 according to an embodiment of the present invention comprising an inductor 34, a capacitor 36, and a switch 38 comprising a first state and a second state, the first state for applying the non-inverted voltage supply 14 to the inductor 34 to generate a current in the inductor 34 and the second state for disconnecting the non-inverted voltage supply 14 from the inductor 34 to discharge the current into the capacitor 36 to generate the inverted voltage supply 18. The inverting voltage regulator 16 further comprises a diode 38 for isolating the non-inverted voltage supply 14 from the inverted voltage supply 18, and a current sensor (resistor Rs 40) for sensing the current in the inductor 34 to generate a current sense signal 42. A programmable hysteretic comparator 44 within the PIVR 16 controls the state of the switch 38 by comparing the current sense signal 42 to a first threshold and to a second threshold. The programmable hysteretic comparator 44 configures the switch 38 into the first state when the current sense signal 42 exceeds the first threshold and into the second state when the current sense signal 42 exceeds the second threshold, wherein the first threshold is substantially different than the second threshold and at least one of the first and second thresholds is programmably configured by the controller 20 relative to the disk drive's mode of operation. A voltage comparator 46 within the PIVR 16 disables the programmable hysteretic comparator 44 (via NAND gate 48) when the inverted voltage supply 18 exceeds a third threshold.

Figure 4:
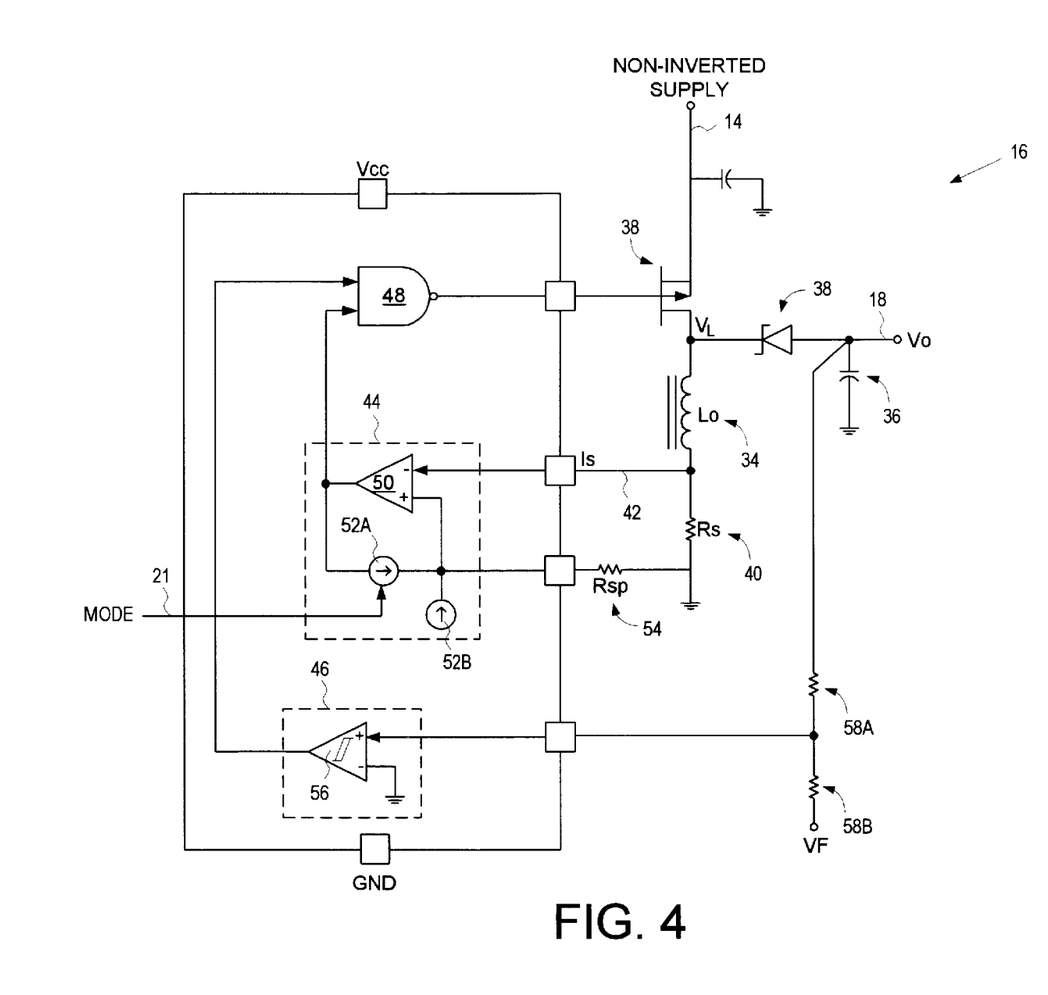
FIG. 4 shows a PIVR according to an embodiment of the present invention wherein the programmable hysteretic comparator comprises current sources and at least one of the current sources is programmable.

FIG. 4 shows implementation details of a suitable programmable hysteretic comparator 44 and voltage comparator 46 according to an embodiment of the present invention. The programmable hysteretic comparator 44 comprises a differential comparator 50 for comparing the current sense signal 42 to a threshold established by current sources 52A and 52B together with resistor Rsp 54. Current source 52A is programmably configured by control signal 21 relative to the disk drive's mode of operation. The first threshold is increased by increasing the amount of current generated by current source 52A, thereby increasing the duty cycle of the waveform shown in FIG. 6 as described below. In the embodiment of FIG. 4, current source 52B generates a very small amount of current so that substantially all of the current stored in the inductor 34 is discharged to the capacitor 36.

Figure 6:
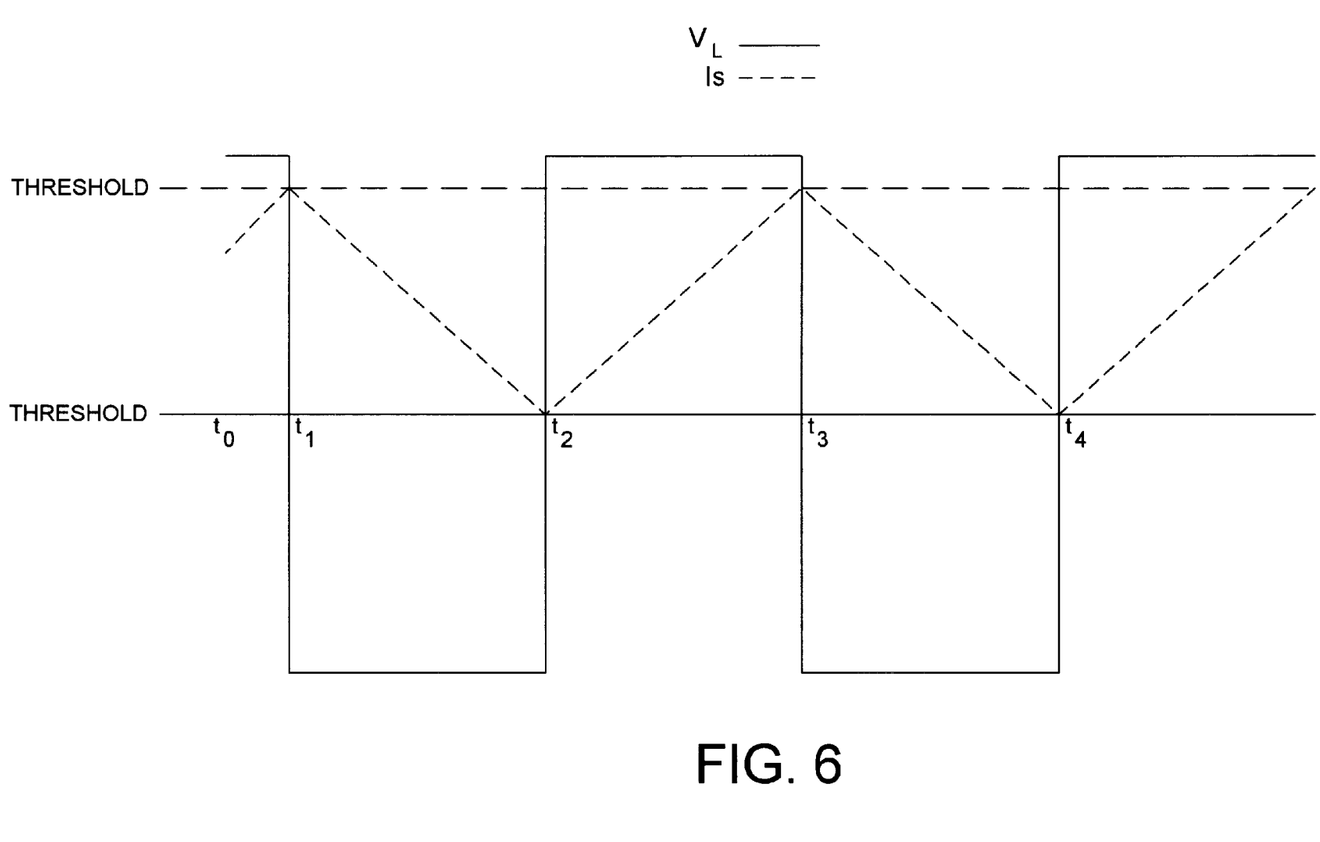
FIG. 6 shows a diagram of the voltage across the inductor of the PIVR vs the current sensed in the inductor.

Operation of the circuitry of FIG. 4 is understood with reference to FIG. 6 which shows a diagram of the voltage across the inductor 34 versus the current 42 sensed in the inductor 34. At time $t_0$ the differential comparator 50 outputs a logical high voltage to turn on switch 38 (via NAND gate 48) and to enable current source 52A. During the time interval $t_0$–$t_1$ a current builds in the inductor 34 while being charged by the non-inverted voltage supply 14. At time $t_1$ the current sense signal 42 exceeds the sum of the current generated by current sources 52A and 52B such that differential comparator 50 outputs a logical low voltage to turn off switch 38 (via NAND gate 48) and disable current source 52A (leaving only current source 52B as the input to the positive terminal of the differential comparator 50). During the time interval $t_1$–$t_2$ the current in inductor 34 discharges into capacitor 36 to generate the inverted voltage supply 18. At time $t_2$ the current sense signal 42 falls below the current generated by current source 52B such that the differential comparator 50 outputs a logical high voltage to turn on switch 38 (via NAND gate 48) and to enable current source 52A During the time interval $t_2$–$t_3$ a current again builds in the inductor 34 while being charged by the non-inverted voltage supply 14 until the current exceeds the sum of the current generated by current sources 52A and 52B at time $t_2$.

The above process repeats until a sufficient amount of current is stored in the capacitor 36 such that the inverted voltage supply 18 exceeds a threshold established by resistors 58A and 58B, wherein the voltage comparator 46 disables the programmable hysteretic comparator 44 via NAND gate 48. This prevents damaging the preamp 8 by limiting the maximum inverted voltage supply 18 as well as conserving power by disabling the PIVR 16 once the inverted voltage supply 18 is within a normal operating range. The voltage comparator 46 of FIG. 4 comprises a hysteretic differential comparator 54 which may help reduce noise, however, the hysteresis may not be necessary in other embodiments.

Figures 5A, 5B:
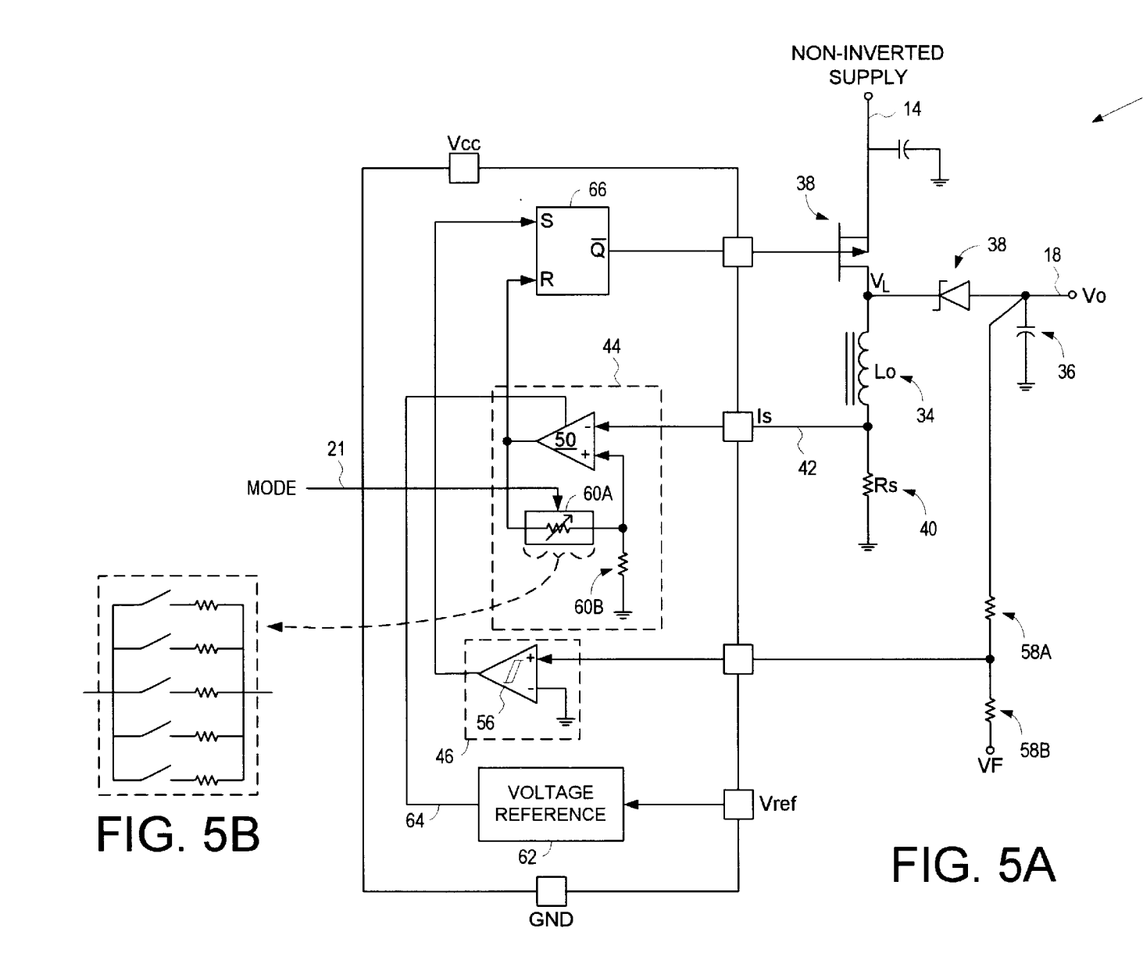
FIGS. 5A and 5B show a PIVR according to an embodiment of the present invention wherein the programmable hysteretic comparator comprises voltage sources and at least one of the voltage sources is programmable.

FIG. 5A illustrates an alternative embodiment for the PIVR 16 wherein the current sources 52A and 52B of FIG. 4 have been replaced by voltage sources 60A and 60B. Control signal 21 configures voltage source 60A relative to the disk drive's mode of operation. When differential comparator 50 outputs a logical high voltage so as to turn on switch 38, voltage source 60A is enabled and the sum of voltage source 60A and 60B is applied to the positive terminal of differential comparator 50. When differential comparator 50 outputs a logical low voltage so as to turn off switch 38, voltage source 60A is disabled leaving only voltage source 60B applied to the positive terminal of differential comparator 50. In the embodiment of FIG. 5A, voltage source 60B generates a very small amount of voltage so that substantially all of the current stored in the inductor 34 is discharged to the capacitor 36. Also in the embodiment of FIG. 5A, a voltage reference generator 62 generates a reference voltage 64 applied to differential comparator 50 in order to increase the accuracy of the peak current detection. Further, the NAND gate 48 of FIG. 4 has been replaced by an S/R register 66.

FIG. 5B shows suitable circuitry for implementing the programmable voltage source 60A of FIG. 5A. A plurality of switches are configured by control signal 21 in order to configure a network of parallel resistors, thereby implementing a programmable resistor. As each switch is turned on, a new resistor is added to the parallel network so as to decrease the resistance of the programmable resistor. As the resistance of the programmable resistor decreases, the peak current in the inductor 34 increases and the frequency of the signal shown in FIG. 6 decreases.

In one embodiment, the disk drive requires more power from the PIVR 16 while in the write mode as compared to the read mode. Therefore, the PIVR 16 is programmed to increase the peak current in the inductor 34 while in write mode so that the PIVR 16 generates more power. During read mode, the PIVR 16 is programmed to decrease the peak current in the inductor 34 in order to reduce the system noise in the read signal 26 induced by the PIVR 16 as well as conserve power for portable applications.

In other embodiments the disk drive operates in additional modes, such as an idle mode wherein the head 6 is parked, and a sleep mode wherein the disk 4 is spun down. The PIVR 16 is programmed relative to these modes of operation which may have specific power requirements different from other modes of operation.

We claim:

1. A disk drive comprising:
   (a) a disk;
   (b) a head actuated radially over the disk;
   (c) a preamp for supplying a write current to the head during a write mode and for amplifying a read signal generated by the head during a read mode;
   (d) an input for receiving a non-inverted voltage supply having a first polarity;
   (e) a programmable inverting voltage regulator, responsive to the non-inverted voltage supply, for generating an inverted voltage supply having a polarity opposite the first polarity, the non-inverted and inverted voltage supplies applied to the preamp; and
   (f) a controller for generating an open loop control signal to configure the programmable inverting voltage regulator relative to at least two modes of operation including the write mode and the read mode.

2. The disk drive as recited in claim 1, wherein the programmable inverting voltage regulator comprises:
   (a) an inductor;
   (b) a capacitor;
   (c) a switch comprising a first state and a second state, the first state for applying the non-inverted voltage supply to the inductor to generate a current in the inductor and the second state for disconnecting the non-inverted voltage supply from the inductor to discharge the current into the capacitor to generate the inverted voltage supply;
   (d) a diode for isolating the non-inverted voltage supply from the inverted voltage supply;
   (e) a current sensor for sensing the current in the inductor and for generating a current sense signal;
   (f) a hysteretic comparator for controlling the state of the switch by comparing the current sense signal to a first threshold and to a second threshold, wherein:
      the hysteretic comparator configures the switch into the first state when the current sense signal exceeds the first threshold;
      the hysteretic comparator configures the switch into the second state when the current sense signal exceeds the second threshold;
      the first threshold is substantially different than the second threshold; and
      at least one of the first and second thresholds is programmably configured by the controller relative to the mode of operation; and
   (g) a voltage comparator for disabling the hysteretic comparator when the second voltage supply exceeds a third threshold.

3. The disk drive as recited in claim 2, wherein the first and second thresholds are generated using current sources.

4. The disk drive as recited in claim 2, wherein the first and second thresholds are generated using voltage sources.

5. The disk drive as recited in claim 4, wherein the hysteretic comparator comprises a programmable resistor for programming the at least one of the first and second thresholds.

6. The disk drive as recited in claim 2, wherein:
   (a) the switch, current sensor, and hysteretic comparator are implemented in an integrated circuit; and
   (b) the inductor and capacitor are implemented external to the integrated circuit.

7. The disk drive as recited in claim 1, wherein the modes of operation further include an idle mode wherein the head is parked.

8. The disk drive as recited in claim 1, wherein the modes of operation further include a sleep mode wherein the disk is spun down.

9. A power driver integrated circuit (IC) for use in a disk drive, the disk drive comprising a disk, a spindle motor for rotating the disk, a head, a voice coil motor (VCM) for actuating the head radially over the disk, and a preamp for supplying a write current to the head during a write mode and for amplifying a read signal generated by the head during a read mode, the power driver IC comprising:
   (a) an input for receiving a non-inverted voltage supply having a first polarity;
   (b) circuitry for generating control signals applied to the spindle motor and VCM; and (c) a programmable inverting voltage regulator, responsive to the non-inverted voltage supply, for generating an inverted voltage supply having a polarity opposite the first polarity, the non-inverted and inverted voltage supplies for use by the preamp, wherein the programmable inverting voltage regulator is configurable open loop relative to at least the write mode and the read mode.

10. The power driver IC as recited in claim 9, wherein the programmable inverting voltage regulator comprises:
   (a) an inductor;
   (b) a capacitor;
   (c) a switch comprising a first state and a second state, the first state for applying the non-inverted voltage supply to the inductor to generate a current in the inductor and the second state for disconnecting the non-inverted voltage supply from the inductor to discharge the current into the capacitor to generate the inverted voltage supply;
   (d) a diode for isolating the non-inverted voltage supply from the inverted voltage supply;
   (e) a current sensor for sensing the current in the inductor and for generating a current sense signal;
   (f) a hysteretic comparator for controlling the state of the switch by comparing the current sense signal to a first threshold and to a second threshold, wherein:
      the hysteretic comparator configures the switch into the first state when the current sense signal exceeds the first threshold;
      the hysteretic comparator configures the switch into the second state when the current sense signal exceeds the second threshold;
      the first threshold is substantially different than the second threshold; and
      at least one of the first and second thresholds is programmably configured by the controller relative to the mode of operation; and
         (g) a voltage comparator for disabling the hysteretic comparator when the second voltage supply exceeds a third threshold.

11. The power driver IC as recited in claim 10, wherein the first and second thresholds are generated using current sources.

12. The power driver IC as recited in claim 10, wherein the first and second thresholds are generated using voltage sources.

13. The power driver IC as recited in claim 12, wherein the hysteretic comparator comprises a programmable resistor for programming the at least one of the first and second thresholds.

14. The power driver IC as recited in claim 10, wherein:
   (a) the switch, current sensor, and hysteretic comparator are implemented in an integrated circuit; and
   (b) the inductor and capacitor are implemented external to the integrated circuit.

15. The power driver IC as recited in claim 9, wherein:
   (a) the disk drive operates in an idle mode wherein the head is parked; and
   (b) the programmable inverting voltage regulator is configurable relative to the idle mode.

16. The power driver IC as recited in claim 9, wherein:
   (a) the disk drive operates in a sleep mode wherein the disk is spun down; and
   (b) the programmable inverting voltage regulator is configurable relative to the sleep mode.

17. A programmable inverting voltage regulator for use in supplying an inverted voltage supply to a preamp in a disk drive during at least a read mode and a write mode, the disk drive comprising a head actuated radially over a disk, the inverting voltage regulator comprising:
   (a) an input for receiving a non-inverted voltage supply having a first polarity;
   (b) an output for outputting the inverted voltage supply having a second polarity opposite the first polarity; and
   (c) an input for receiving an open loop control signal for configuring a maximum power supplied by the programmable inverting voltage regulator relative to at least the read mode and write mode.

18. The programmable inverting voltage regulator as recited in claim 17, further comprising:
   (a) an inductor;
   (b) a capacitor;
   (c) a switch comprising a first state and a second state, the first state for applying the non-inverted voltage supply to the inductor to generate a current in the inductor and the second state for disconnecting the non-inverted voltage supply from the inductor to discharge the current into the capacitor to generate the inverted voltage supply;
   (d) a diode for isolating the non-inverted voltage supply from the inverted voltage supply;
   (e) a current sensor for sensing the current in the inductor and for generating a current sense signal;
   (f) a hysteretic comparator for controlling the state of the switch by comparing the current sense signal to a first threshold and to a second threshold, wherein:
      the hysteretic comparator configures the switch into the first state when the current sense signal exceeds the first threshold;
      the hysteretic comparator configures the switch into the second state when the current sense signal exceeds the second threshold;
      the first threshold is substantially different than the second threshold; and
      at least one of the first and second thresholds is programmably configured by the controller relative to the mode of operation; and
   (g) a voltage comparator for disabling the hysteretic comparator when the second voltage supply exceeds a third threshold.

19. The programmable inverting voltage regulator as recited in claim 18, wherein the first and second thresholds are generated using current sources.

20. The programmable inverting voltage regulator as recited in claim 18, wherein the first and second thresholds are generated using voltage sources.

21. The programmable inverting voltage regulator as recited in claim 20, wherein the hysteretic comparator comprises a programmable resistor for programming the at least one of the first and second thresholds.

22. The programmable inverting voltage regulator as recited in claim 18, wherein:
   (a) the switch, current sensor, and hysteretic comparator are implemented in an integrated circuit; and
   (b) the inductor and capacitor are implemented external to the integrated circuit.

23. The programmable inverting voltage regulator as recited in claim 17, wherein:
   (a) the disk drive operates in an idle mode wherein the head is parked; and (b) the programmable inverting voltage regulator is configurable relative to the idle mode.

24. The programmable inverting voltage regulator as recited in claim 17, wherein:
   (a) the disk drive operates in a sleep mode wherein the disk is spun down; and
   (b) the programmable inverting voltage regulator is configurable relative to the sleep mode.

25. The programmable inverting voltage regulator as recited in claim 17, wherein:
   (a) the switch, current sensor, and hysteretic comparator are implemented in a first integrated circuit; and
   (b) the disk drive further comprises a power driver integrated circuit for generating control signals applied to a voice coil motor and a spindle motor.

\* \* \* \* \*